US012454663B2

(12) United States Patent
Nad et al.

(10) Patent No.: US 12,454,663 B2
(45) Date of Patent: *Oct. 28, 2025

(54) CLEANING BAR

(71) Applicants: Dow Global Technologies LLC, Midland, MI (US); Dow Silicones Corporation, Midland, MI (US)

(72) Inventors: Saugata Nad, Brussels (BE); Serge Creutz, Liege (BE); Deepak Dandekar, Maharashtra (IN)

(73) Assignees: Dow Global Technologies LLC, Midland, MI (US); DOW SILICONES CORPORATION, Midland, MI (US)

( * ) Notice: Subject to any disclaimer, the term of this patent is extended or adjusted under 35 U.S.C. 154(b) by 258 days.

This patent is subject to a terminal disclaimer.

(21) Appl. No.: 18/259,597

(22) PCT Filed: Feb. 22, 2022

(86) PCT No.: PCT/US2022/017185

§ 371 (c)(1),
(2) Date: Jun. 28, 2023

(87) PCT Pub. No.: WO2022/182613

PCT Pub. Date: Sep. 1, 2022

(65) Prior Publication Data

US 2024/0060020 A1 Feb. 22, 2024

(30) Foreign Application Priority Data

Feb. 25, 2021 (IN) ............................ 202141007970

(51) Int. Cl.

| | |
|---|---|
| ***C11D 1/00*** | (2006.01) |
| ***C11D 3/22*** | (2006.01) |
| ***C11D 3/37*** | (2006.01) |
| ***C11D 3/40*** | (2006.01) |
| ***C11D 3/50*** | (2006.01) |
| ***C11D 9/00*** | (2006.01) |
| ***C11D 13/10*** | (2006.01) |
| ***C11D 17/00*** | (2006.01) |

(52) U.S. Cl.

CPC .......... *C11D 17/0069* (2013.01); *C11D 3/222* (2013.01); *C11D 3/40* (2013.01); *C11D 3/50* (2013.01); *C11D 2111/12* (2024.01)

(58) Field of Classification Search

CPC .. C11D 1/00; C11D 3/22; C11D 3/222; C11D 3/225; C11D 3/3707; C11D 3/40; C11D 3/50; C11D 9/00; C11D 11/0017; C11D 13/10; C11D 17/0069

See application file for complete search history.

(56) References Cited

U.S. PATENT DOCUMENTS

| | | | |
|---|---|---|---|
| 4,175,183 A | 11/1979 | Ayers | |
| 4,321,367 A | 3/1982 | Cheng et al. | |
| 4,732,693 A | 3/1988 | Hight | |
| 6,958,393 B2 | 10/2005 | Schlesiger et al. | |
| 6,974,789 B1 | 12/2005 | Whitaker et al. | |
| 7,041,168 B2 | 5/2006 | Schlesiger et al. | |
| 8,680,032 B2 | 3/2014 | Lachmann et al. | |
| 10,150,704 B2 | 12/2018 | Hild et al. | |
| 10,494,303 B2 | 12/2019 | Breckwoldt et al. | |
| 10,851,181 B2 * | 12/2020 | Aoki | B01D 67/0006 |
| 2004/0127700 A1 | 7/2004 | Schlesiger | |
| 2024/0084221 A1 * | 3/2024 | Nad | C11D 3/225 |
| 2025/0154439 A1 * | 5/2025 | Creutz | C11D 7/268 |

FOREIGN PATENT DOCUMENTS

| | | |
|---|---|---|
| CN | 103553418 | 2/2014 |
| DE | 202010008420 | 12/2010 |
| EP | 0100125 | 8/1984 |
| EP | 1625195 | 2/2006 |
| GB | 2339575 A | 2/2000 |
| JP | 2014218465 | 11/2014 |
| WO | 2002033037 | 4/2002 |
| WO | 2002033038 | 4/2002 |
| WO | 2009093150 | 7/2009 |
| WO | 2016066812 | 5/2016 |
| WO | 2020176211 | 9/2020 |
| WO | 2020223037 | 11/2020 |
| WO | 2020223039 | 11/2020 |
| WO | 2020223040 | 11/2020 |

OTHER PUBLICATIONS

Bartelmus, "Die Analytik von Celluloseathergruppen", Zeitschrift fuer Analytische Chemie, 1977, vol. 286, pp. 161-190.

International Preliminary Report on Patentability from corresponding International Application No. PCT/US2022/017185 dated Aug. 29, 2023.

Davaran et al., Synthesis of chemically cross-linked hydroxypropyl methylcellulose hydrogels and their application in controlled release of 5-amino salicylic acid, 2007, Drug Dev Ind Pharm, 33 (8), pp. 881-887 (yeaser 2007).

* cited by examiner

*Primary Examiner* — Brian P Mruk
(74) *Attorney, Agent, or Firm* — Thomas S. Deibert

(57) ABSTRACT

A cleaning bar is provided, comprising: a cleaning surfactant; water; and a crosslinked cellulose ether containing 0.1 to 0.6 wt %, based on weight of the crosslinked cellulose ether, of polyether groups; wherein the cleaning bar is a solid.

10 Claims, No Drawings

CLEANING BAR

The present invention relates to a cleaning bar. In particular, the present invention relates to a cleaning bar, comprising: a cleaning surfactant; water and a crosslinked cellulose containing 0.1 to 0.6 wt %, based on weight of the crosslinked cellulose ether, of polyether groups; wherein the cleaning bar is a solid.

Cleaning bars remain popular with consumers for cleansing laundry, hard surfaces, skin and hair.

Finishing milled cleaning bars are conventionally prepared from non-soap surfactants or soap noodles having a total fatty matter (TFM) content of more than 70 wt %, 10-14 wt % water and other components (e.g., titanium dioxide, surfactant and fragrance). Currently milled bars have a typical water content of about 8 to 15 wt % and had non-milled bars have a water content of 20 to 25 wt %.

Cleaning bars of varying compositions are known. Conventional cleaning bars are formulated with a variety of additives to impart benefits that are inherent to the cleaning bars. Conventional cleaning bar contain at least one surfactant (e.g., a monovalent sodium, potassium, ammonium and alkanol ammonium salts of monocarboxylic fatty acids) and optionally one or more adjuvants such as moisturizers, humectants, antibacterial agents, water, fillers, polymers, processing aids, dyes, fragrances, etc., to enhance the cleaning and conditioning properties of the cleaning bar.

It is desirable to create cleaning bars having high water content to facilitate formulation and process efficiency. Notwithstanding, it has been difficult to maintain the high water content of the formulation following processing to form the finished cleaning bar.

Thus, there remains a need for new cleaning bar formulations enabling high water content in the finished cleaning bar while retaining other desirable cleaning bar properties such as wear rate.

The present invention provides a cleaning bar, comprising: 5 to <78.99 wt %, based on weight of the cleaning bar, of a cleaning surfactant; >21 to 50 wt %, based on weight of the cleaning bar, of water; and 0.01 to 5 wt %, based on weight of the cleaning bar, of a crosslinked cellulose ether containing 0.1 to 0.6 wt %, based on weight of the crosslinked cellulose ether, of polyether groups; 0 to 3 wt %, based on weight of the cleaning bar, of a processing aid; 0 to 3 wt %, based on weight of the cleaning bar, of an optional component selected from the group consisting of a fragrance, a colorant/dye or a combination thereof; and 0 to 15 wt %, based on weight of the cleaning bar, of a filler; wherein the cleaning bar is a solid.

The present invention provides a cleaning bar, comprising: 5 to <78.99 wt %, based on weight of the cleaning bar, of a cleaning surfactant; >21 to 50 wt %, based on weight of the cleaning bar, of water; and 0.01 to 5 wt %, based on weight of the cleaning bar, of an irreversibly crosslinked cellulose ether containing 0.1 to 0.6 wt %, based on weight of the irreversibly crosslinked cellulose ether, of polyether groups; 0 to 3 wt %, based on weight of the cleaning bar, of a processing aid; 0 to 3 wt %, based on weight of the cleaning bar, of an optional component selected from the group consisting of a fragrance, a colorant/dye or a combination thereof; and 0 to 15 wt %, based on weight of the cleaning bar, of a filler; wherein the cleaning bar is a solid.

The present invention provides a method of making a cleaning bar, comprising: providing a cleaning surfactant; providing water; providing a crosslinked cellulose ether containing 0.1 to 0.6 wt %, based on weight of the crosslinked cellulose ether, of polyether groups; mixing the cleaning surfactant, the crosslinked cellulose ether and the water to form a combination; milling the combination; extruding the milled combination; and stamping the extruded material to provide the cleaning bar.

The present invention provides a method of making a cleaning bar, comprising: providing a cleaning surfactant; providing water; providing a crosslinked cellulose ether containing 0.1 to 0.6 wt %, based on weight of the crosslinked cellulose ether, of polyether groups; providing a fragrance and providing a processing aid; mixing the cleaning surfactant, crosslinked cellulose ether, the fragrance, the processing aid and the water to form a combination; milling the combination; extruding the milled combination; and stamping the extruded material to provide the cleaning bar.

DETAILED DESCRIPTION

We have surprisingly found that cleaning bars containing a crosslinked cellulose ether containing polyether groups in the crosslinker (preferably, cellulose ethers containing alkyl ether and hydroxyalkyl ether groups) facilitates a high water content (>21 wt %) in the finished cleaning bar while maintaining an acceptable wear resistance.

Unless otherwise indicated, ratios, percentages, parts, and the like are by weight.

The term "DS" as used herein and in the appended claims means the number of alkyl substituted OH groups per anhydroglucose unit in a cellulose ether, as determined by the Zeisel Method.

The term "DS (methyl)" or "DS (M)" as used herein and in the appended claims means the number of methyl substituted OH groups per anhydroglucose unit in a cellulose ether, as determined by the Zeisel Method.

The term "MS" as used herein and in the appended claims means the number of moles of etherification reagent which are bound as ether per mol of anhydroglucose unit as hydroxyalkyl substituents in a cellulose ether, as determined by the Zeisel Method.

The term "MS (hydroxyethyl)" or "MS (HE)" as used herein and in the appended claims means the number of moles of etherification reagent which are bound as ether per mol of anhydroglucose unit as hydroxyethyl substituents in a cellulose ether, as determined by the Zeisel Method.

The term "MS (hydroxypropyl)" or "MS (HP)" as used herein and in the appended claims means the number of moles of etherification reagent which are bound as ether per mol of anhydroglucose unit as hydroxypropyl substituents in a cellulose ether, as determined by the Zeisel Method.

The term "Zeisel Method" refers to the Zeisel cleavage procedure for determination of MS and DS. See G. Bartelmus and R. Ketterer, *Zeitschrift fuer Analytische Chemie*, Vol. 286 (1977, Springer, Berline, DE), pages 161-190.

Preferably, the cleaning bar of the present invention is selected from the group consisting of a laundry detergent bar, a personal care cleansing bar, a shampoo bar, a hard surface cleaning bar, a toilet block and a dish washing bar. More preferably, the cleaning bar of the present invention is selected from the group consisting of a laundry detergent bar, a personal care cleansing bar and a shampoo bar. Most preferably, the cleaning bar of the present invention is a laundry detergent bar.

Preferably, the cleaning bar of the present invention, comprises: 5 to <78.99 wt % (preferably, 7 to 70 wt %; more preferably, 8 to 60 wt %; most preferably, 10 to 55 wt %), based on weight of the cleaning bar, of a cleaning surfactant; >21 to 50 wt % (preferably, >23 to 45 wt %; more preferably; 25 to 40 wt %; most preferably, 30 to 37.5 wt %), based on weight of the cleaning bar, of water; and 0.01 to 5 wt % (preferably, 0.05 to 3 wt %; more preferably, 0.1 to 2.5 wt %; still more preferably, 0.15 to 2 wt %; most preferably, 0.2 to 1.5 wt %), based on weight of the cleaning bar, of a crosslinked cellulose ether containing 0.1 to 0.6 wt %, based on weight of the crosslinked cellulose ether, of polyether groups (preferably, wherein the crosslinked cellulose ether is an irreversibly crosslinked cellulose ether); 0 to 3 wt % (preferably, 0.01 to 3 wt %), based on weight of the cleaning bar, of a processing aid; 0 to 3 wt % (preferably, 0.01 to 3 wt %), based on weight of the cleaning bar, of an optional component selected from the group consisting of a fragrance, a colorant/dye or a combination thereof; and 0 to 70 wt % (preferably, 2 to 65 wt %; more preferably, 2.5 to 60 wt %; most preferably, 3 to 55 wt %), based on weight of the cleaning bar, of a filler; wherein the cleaning bar is a solid (i.e., wherein the cleaning bar does not perceptibly change shape when placed on a rigid surface and left to stand at room temperature, 22° C., and pressure, 101.4 kPa, for 24 hours).

Preferably, the cleaning bar of the present invention, comprises: 5 to <78.99 wt % (preferably, 7 to 70 wt %; more preferably, 8 to 60 wt %; most preferably, 10 to 55 wt %), based on weight of the cleaning bar, of a cleaning surfactant. More preferably, the cleaning bar of the present invention, comprises: 5 to <78.99 wt % (preferably, 7 to 70 wt %; more preferably, 8 to 60 wt %; most preferably, 10 to 55 wt %), based on weight of the cleaning bar, of a cleaning surfactant; wherein the cleaning surfactant is selected from the group consisting of non-soap surfactant, soap and mixtures thereof. Most preferably, the cleaning bar of the present invention, comprises: 35 to <78.99 wt % (preferably, 37 to 70 wt %; more preferably, 40 to 60 wt %; most preferably, 45 to 55 wt %), based on weight of the cleaning bar, of a cleaning surfactant; wherein the cleaning surfactant includes a soap.

Preferably, the cleaning bar of the present invention 5 to 30 wt % (preferably, 7 to 25 wt %; more preferably, 8 to 20 wt %; most preferably, 10 to 15 wt %), based on weight of the cleaning bar, of a non-soap surfactant. More preferably, the cleaning bar of the present invention 5 to 30 wt % (preferably, 7 to 25 wt %; more preferably, 8 to 20 wt %; most preferably, 10 to 15 wt %), based on weight of the cleaning bar, of a non-soap surfactant; wherein the non-soap surfactant is selected from the group consisting of alkyl sulfonic acids, alkyl sulfates, alkyl sulfonates, alkyl sulfosuccinates, alkyl benzene sulfonic acid, alkyl benzene sulfates, alkyl benzene sulfonates, alkyl ether sulfonic acids, alkyl ether sulfates, alkyl ether sulfonates, paraffin sulfonic acids, paraffin sulfates, paraffin sulfonates, olefin sulfonic acids, olefin sulfates, olefin sulfonates, alpha-sulfocarboxylates, esters of alpha-sulfocarboxylates, alkyl glyceryl ether sulfonic acids, alkyl glyceryl ether sulfates, alkyl glyceryl ether sulfonates, sulfates of fatty acids, sulfonates of fatty acids, sulfonates of fatty acid esters, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, salts thereof and mixtures thereof. Still more preferably, the cleaning bar of the present invention comprises 5 to 30 wt % (preferably, 7 to 25 wt %; more preferably, 8 to 20 wt %; most preferably, 10 to 15 wt %), based on weight of the cleaning bar, of a non-soap surfactant; wherein the non-soap surfactant is selected from the group consisting of $C_{8-20}$ alkyl benzene sulfonic acid, $C_{8-20}$ alkyl benzene sulfates, $C_{8-10}$ alkyl benzene sulfonate, $C_{8-20}$ alkyl ether sulfonic acids, $C_{8-20}$ alkyl ether sulfates. $C_{8-20}$ alkyl ether sulfonates, paraffin sulfonic acid, paraffin sulfates, paraffin sulfonate, alpha-olefin sulfonic acid, alpha-olefin sulfate, alpha-olefin sulfonate, sulfonates of fatty acids, sulfonates of fatty acid esters, salts thereof and mixtures thereof. Yet still more preferably, the cleaning bar of the present invention comprises 5 to 30 wt % (preferably, 7 to 25 wt %; more preferably, 8 to 20 wt %; most preferably, 10 to 15 wt %), based on weight of the cleaning bar, of a non-soap surfactant; wherein the non-soap surfactant is selected from the group consisting of $C_{10-16}$ alkyl benzene sulfonic acid, $C_{10-16}$ alkyl benzene sulfonate, $C_{10-16}$ alkyl polyethoxy sulfonic acids, $C_{10-16}$ alkyl polyethoxy sulfates, $C_{10-16}$ alkyl polyethoxy sulfonates, salts thereof and mixtures thereof. Even more preferably, the cleaning bar of the present invention comprises 5 to 30 wt % (preferably, 7 to 25 wt %; more preferably, 8 to 20 wt %; most preferably, 10 to 15 wt %), based on weight of the cleaning bar, of a non-soap surfactant; wherein the non-soap surfactant is selected from the group consisting of $C_{11-14}$ alkyl benzene sulfonic acid, $C_{11-14}$ alkyl benzene sulfonate, $C_{11-14}$ alkyl polyethoxy sulfonic acids, $C_{11-14}$ alkyl polyethoxy sulfates, $C_{11-14}$ alkyl polyethoxy sulfonates, salts thereof and mixtures thereof. Most preferably, the cleaning bar of the present invention comprises 5 to 30 wt % (preferably, 7 to 25 wt %; more preferably, 8 to 20 wt %; most preferably, 10 to 15 wt %), based on weight of the cleaning bar, of a non-soap surfactant; wherein the non-soap surfactant includes (preferably, is) $C_{11-14}$ alkyl benzene sulfonic acid.

Preferably, the cleaning bar of the present invention, comprises: 35 to <78.99 wt % (preferably, 37 to 70 wt %; more preferably, 40 to 60 wt %; most preferably, 45 to 55 wt %), based on weight of the cleaning bar, of a cleaning surfactant. More preferably, the cleaning bar of the present invention, comprises: 35 to <78.99 wt % (preferably, 37 to 70 wt %; more preferably, 40 to 60 wt %; most preferably, 45 to 55 wt %), based on weight of the cleaning bar, of a cleaning surfactant, wherein the cleaning surfactant is a soap selected from the group consisting of monovalent salts of monocarboxylic fatty acids having counterions selected from the group consisting of sodium, potassium, ammonium and alkanol ammonium ions. Still more preferably, the cleaning bar of the present invention, comprises: 35 to <78.99 wt % (preferably, 37 to 70 wt %; more preferably, 40 to 60 wt %; most preferably, 45 to 55 wt %), based on weight of the cleaning bar, of a cleaning surfactant; wherein the cleaning surfactant is a soap; wherein the soap is an alkali (preferably, sodium) salt of a fatty acid from at least one of an animal fat and a vegetable oil. Yet more preferably, the cleaning bar composition of the present invention, comprises: 35 to <78.99 wt % (preferably, 37 to 70 wt %; more preferably, 40 to 60 wt %; most preferably, 45 to 55 wt %), based on weight of the cleaning bar, of a cleaning surfactant; wherein the cleaning surfactant is a soap; wherein the soap is an alkali (preferably, sodium) salt of a fatty acid from at least one of palm oil, palm kernel oil, castor oil, rice bran oil, sunflower oil, coconut oil, soybean oil, peanut oil, tallow, lard, fish oil and blends thereof. Yet still more preferably, the cleaning bar of the present invention, comprises: 35 to <78.99 wt % (preferably, 37 to 70 wt %; more preferably, 40 to 60 wt %; most preferably, 45 to 55 wt %), based on weight of the cleaning bar, of a cleaning surfactant; wherein the cleaning surfactant is a soap; wherein the soap is an alkali (preferably, sodium) salt of a fatty acid from a 40:60 to 97:3 blend of oils and fats (preferably, the blend of oils and fats is selected from a blend of palm and palm kernel oils and a blend of palm and coconut kernel oils). Most preferably, the cleaning bar of the present invention, comprises: 35 to <78.99 wt % (preferably, 37 to 70 wt %; more preferably, 40 to 60 wt %; most preferably, 45 to 55 wt %), based on weight of the cleaning bar, of a cleaning surfactant; wherein the cleaning surfactant is a soap; wherein the soap is an alkali (preferably, sodium) salt of a fatty acid from an 50:50, 60:40, 70:30, 80:20 or 90:10 (preferably, an 80:20) blend of palm oil and palm kernel oil.

Preferably, the cleaning bar of the present invention, comprises: >21 to 50 wt % (preferably, >23 to 45 wt %; more preferably; 25 to 40 wt %; most preferably, 30 to 37.5 wt %), based on weight of the cleaning bar, of water. More preferably, the cleaning bar of the present invention, comprises: >21 to 50 wt % (preferably, >23 to 45 wt %; more preferably; 25 to 40 wt %; most preferably, 30 to 37.5 wt %), based on weight of the cleaning bar, of water; wherein the water is at least one of distilled and deionized water. Most preferably, the cleaning bar of the present invention, comprises: >21 to 50 wt % (preferably, >23 to 45 wt %; more preferably; 25 to 40 wt %; most preferably, 30 to 37.5 wt %), based on weight of the cleaning bar, of water; wherein the water is deionized water.

Preferably, the cleaning bar of the present invention, comprises: 0.01 to 5 wt % (preferably, 0.05 to 3 wt %; more preferably, 0.1 to 2.5 wt %; still more preferably, 0.15 to 2 wt %; most preferably, 0.2 to 1.5 wt %), based on weight of the cleaning bar, of a crosslinked cellulose ether containing 0.1 to 0.6 wt %, based on weight of the crosslinked cellulose ether, of polyether groups. More preferably, the cleaning bar of the present invention, comprises: 0.01 to 5 wt % (preferably, 0.05 to 3 wt %; more preferably, 0.1 to 2.5 wt %; still more preferably, 0.15 to 2 wt %; most preferably, 0.2 to 1.5 wt %), based on weight of the cleaning bar, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups and wherein the base cellulose ether is a mixed cellulose ether containing hydroxyalkyl ether groups and alkyl ether groups. Still more preferably, the cleaning bar of the present invention, comprises: 0.01 to 5 wt % (preferably, 0.05 to 3 wt %; more preferably, 0.1 to 2.5 wt %; still more preferably, 0.15 to 2 wt %; most preferably, 0.2 to 1.5 wt %), based on weight of the cleaning bar, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups and wherein the base cellulose ether is selected from the group consisting of hydroxyethyl methylcellulose, hydroxypropyl methyl cellulose, methyl hydroxyethyl hydroxypropylcellulose, ethyl hydroxyethyl cellulose and combinations thereof. Most preferably, the cleaning bar of the present invention, comprises: 0.01 to 5 wt % (preferably, 0.05 to 3 wt %; more preferably, 0.1 to 2.5 wt %; still more preferably, 0.15 to 2 wt %; most preferably, 0.2 to 1.5 wt %), based on weight of the cleaning bar, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups and wherein the base cellulose ether is hydroxyethyl methylcellulose.

Preferably, the cleaning bar of the present invention, comprises: 0.01 to 5 wt % (preferably, 0.05 to 3 wt %; more preferably, 0.1 to 2.5 wt %; still more preferably, 0.15 to 2 wt %; most preferably, 0.2 to 1.5 wt %), based on weight of the cleaning bar, of a crosslinked cellulose ether containing 0.1 to 0.6 wt %, based on weight of the crosslinked cellulose ether, of polyether groups and wherein the crosslinked cellulose either is an irreversibly crosslinked cellulose ether. More preferably, the cleaning bar of the present invention, comprises: 0.01 to 5 wt % (preferably, 0.05 to 3 wt %; more preferably, 0.1 to 2.5 wt %; still more preferably, 0.15 to 2 wt %; most preferably, 0.2 to 1.5 wt %), based on weight of the cleaning bar, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups; wherein the base cellulose ether is a mixed cellulose ether containing hydroxyalkyl ether groups and alkyl ether groups and wherein the crosslinked cellulose either is an irreversibly crosslinked cellulose ether. Still more preferably, the cleaning bar of the present invention, comprises: 0.01 to 5 wt % (preferably, 0.05 to 3 wt %; more preferably, 0.1 to 2.5 wt %; still more preferably, 0.15 to 2 wt %; most preferably, 0.2 to 1.5 wt %), based on weight of the cleaning bar, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups; wherein the base cellulose ether is selected from the group consisting of hydroxyethyl methylcellulose, hydroxypropyl methyl cellulose, methyl hydroxyethyl hydroxypropylcellulose, ethyl hydroxyethyl cellulose and combinations thereof and wherein the crosslinked cellulose either is an irreversibly crosslinked cellulose ether. Most preferably, the cleaning bar of the present invention, comprises: 0.01 to 5 wt % (preferably, 0.05 to 3 wt %; more preferably, 0.1 to 2.5 wt %; still more preferably, 0.15 to 2 wt %; most preferably, 0.2 to 1.5 wt %), based on weight of the cleaning bar, of a crosslinked cellulose ether containing 0.1 to 0.6 wt %, based on weight of the crosslinked cellulose ether, of polyether groups; wherein the crosslinked cellulose ether comprises a base cellulose ether and crosslinks; wherein the crosslinks contain the polyether groups; wherein the base cellulose ether is hydroxyethyl methylcellulose and wherein the crosslinked cellulose either is an irreversibly crosslinked cellulose ether.

Preferably, the crosslinked cellulose ether contains 0.1 to 0.6 wt % (preferably, 0.12 to 0.6 wt %; more preferably, 0.12 to 0.45 wt %; most preferably, 0.12 to 0.29 wt %), based on weight of the crosslinked cellulose ether, of polyether groups. More preferably, the crosslinked cellulose ether contains 0.1 to 0.6 wt % (preferably, 0.12 to 0.6 wt %; more preferably, 0.12 to 0.45 wt %; most preferably, 0.12 to 0.29 wt %), based on weight of the crosslinked cellulose ether, of polyether groups; wherein the polyether groups are polyoxyalkylene groups having 2 to 100 (preferably, 2 to 20; more preferably. 3 to 15) oxyalkylene groups per crosslink. Most preferably, the crosslinked cellulose ether contains 0.1 to 0.6 wt % (preferably, 0.12 to 0.6 wt %; more preferably, 0.12 to 0.45 wt %; most preferably, 0.12 to 0.29 wt %), based on weight of the crosslinked cellulose ether, of polyether groups; wherein the polyether groups are polyoxypropylene groups having 2 to 100 (preferably, 2 to 20; more preferably, 3 to 15) oxypropylene groups per crosslink.

Preferably, crosslinked cellulose ether of the present invention comprises a base cellulose ether having crosslinks containing 0.1 to 0.6 wt %, based on weight of the crosslinked cellulose ether, of polyether groups. Preferably, the base cellulose ether is selected from hydroxyalkyl cellulose ethers, alkyl cellulose ethers and combinations thereof. Examples of base cellulose ethers include, for example, methylcellulose, ethylcellulose, propylcellulose, butylcellulose, hydroxyethyl methylcellulose, hydroxypropyl methylcellulose, hydroxyethylcellulose, ethylhydroxyethylcellulose, methylethylhydroxyethylcellulose, hydrophobically modified ethylhydroxyethylcellulose, hydrophobically modified hydroxyethylcellulose, sulfoethyl methylhydroxyethylcellulose, sulfoethyl methylhydroxypropylcellulose and sulfoethyl hydroxyethylcellulose. Preferably, the base cellulose ethers are mixed cellulose ethers that contain both hydroxyalkyl ether groups and alkyl ether groups, such as, alkyl hydroxyethyl cellulose and hydroxyalkyl methylcellulose (e.g., hydroxyethyl methylcellulose, hydroxypropyl methylcellulose, methyl hydroxyethyl hydroxypropylcellulose and ethylhydroxyethyl cellulose).

Preferably, the base cellulose ether contains hydroxyalkyl ether substitutions. More preferably, the base cellulose ether has a degree of hydroxyethyl ether substitutions, MS (HE), or hydroxypropyl ether substitutions, MS (HP), of 1.5 to 4.5 (preferably, 2.0 to 3.0).

Preferably, the base cellulose ether contains methyl ether substitutions. More preferably, the base cellulose ether has a degree of methyl ether substitution, DS (M), of 1.2 to 2.1 (preferably, 1.3 to 1.7; more preferably, 1.35 to 1.60).

Preferably, the base cellulose ether is a mixed cellulose ether containing hydroxyalkyl ether substitutions and alkyl ether substitutions. More preferably, the base cellulose ether is a mixed cellulose ether having a degree of hydroxyethyl ether substitution, MS (HE), of 0.05 to 0.75 (preferably, 0.15 to 0.45; more preferably, 0.20 to 0.40) and a degree of methyl ether substitution, DS (M), of 1.2 to 2.1 (preferably, 1.3 to 1.7, more preferably, 1.35 to 1.60).

Preferably, the base cellulose ether is a mixed cellulose ether containing hydroxyalkyl ether substitutions and alkyl ether substitutions. More preferably, the base cellulose ether is a mixed cellulose ether having a degree of hydroxypropyl ether substitution, MS (PE), of 0.1 to 1.5 (preferably, 0.2 to 1.2) and a degree of methyl ether substitution, DS (M), of 1.2 to 2.1 (preferably, 1.3 to 2.0).

Preferably, the crosslinked cellulose ether comprises a base cellulose ether having crosslinks containing 0.1 to 0.6 wt %, based on weight of the crosslinked cellulose ether, of polyether groups; wherein the base cellulose ether is a hydroxyethyl methyl cellulose and wherein the crosslinks are polyoxypropylene dioxyethylene ether crosslinks, such as those produced as the reaction product of hydroxyethyl methyl cellulose with polypropylene glycol (PPG) glycidylether.

Crosslinking agents used to crosslink the base cellulose ether to form the crosslinked cellulose ether include compounds having a polyoxyalkylene or polyalkylene glycol group and two or more (preferably, two) crosslinking groups, such as, halogen groups, glycidyl or epoxy groups, and ethylenically unsaturated groups (e.g., vinyl groups) that form ether bonds with the base cellulose ether to form the crosslinked cellulose ether. Preferably, the crosslinking agent is selected from the group consisting of 1,2-dichloro (poly)alkoxy ethers, dichloropolyoxyethylene, diglycidyl polyalkoxy ethers, diglycidyl phosphonate, divinyl polyoxyalkylenes containing a sulphone group. Crosslinking agents having two different types of functional groups can be used. Examples include diglycidyl polyoxypropylenes and glycidyl(poly)oxyalkyl methacrylate. Preferably, the crosslinking agent contains 2 to 100 (preferably, 2 to 20; more preferably, 3 to 15) oxyalkylene groups per molecule.

Preferably, the amount of crosslinking agent included in the crosslinked cellulose ether ranges from 0.0001 to 0.05 eq (preferably, 0.0005 to 0.01 eq; more preferably, 0.001 to 0.005 eq), wherein the unity "eq" represents the molar ratio of moles of the crosslinking agent relative to the number of moles of anhydroglucose units (AGU) in the base cellulose ether.

Preferably, the crosslinked cellulose ether is an irreversibly crosslinked cellulose ether. That is, the crosslinks in the crosslinked cellulose ether do not break down during the intended use of the crosslinked cellulose ether under normal conditions. In contrast, reversible crosslinks will break down during the intended use of the crosslinked cellulose ether under normal conditions. An example of reversible crosslinks in cellulose ethers intended for use in cleaning bars are those created using aldehyde based crosslinkers (e.g., glyoxal), which crosslinks break down upon dissolution of the crosslinked material in water.

Preferably, the cleaning bar of the present invention comprises <0.5 wt % (preferably, <0.01 wt %; more preferably, <0.001 wt %; still more preferably, <0.0001 wt %; most preferably, <the detectable limit), based on weight of the cleaning bar, of crosslinked carboxymethylcellulose.

Preferably, the cleaning bar of the present invention, is a solid. The term "solid" as used herein and in the appended claims in reference to a cleaning bar means that the cleaning bar will not perceptibly change shape when placed on a rigid surface and left to stand on the rigid surface at room temperature (22° C.) and pressure (101.4 kPa) for 24 hours.

Preferably, the cleaning bar of the present invention has a wear rate of 0.5 to 11 wt % (more preferably, 1 to 8 wt %; most preferably, 1 to 4 wt %), wherein the wear rate is the loss in weight of the cleaning bar after 4 days of use as described in the Examples.

Preferably, the cleaning bar of the present invention, further comprises an optional ingredient. More preferably, the cleaning bar of the present invention, further comprises an optional ingredient; wherein the optional ingredient is selected from the group consisting of builders; humectants; processing aids (e.g., titanium dioxide); preservatives (e.g., benzoic acid, sorbic acid, phenoxyethanol); antioxidants (e.g., butylated hydroxytoluene); viscosity modifiers; polymers; free fatty acids; foam stabilizers; foam enhancers; fillers; chelating agents; antimicrobial agents (e.g., biocides); pH adjusting agents; pH buffering agents; fragrances/perfumes; salts; colorants (e.g., dyes) and mixtures thereof. Most preferably, the cleaning bar of the present invention, further comprises an optional ingredient selected from the group consisting of a processing aid (e.g., titanium dioxide), a fragrance, a colorant and mixtures thereof.

Preferably, the cleaning bar of the present invention, optionally further comprises 0 to 50 wt % (preferably, 8 to 40 wt %; more preferably, 10 to 30 wt %; most preferably, 10.5 to 15 wt %), based on weight of the cleaning bar, of a builder. More preferably, the cleaning bar of the present invention, optionally further comprises 0 to 50 wt % (preferably, 8 to 40 wt %; more preferably, 10 to 30 wt %; most preferably, 10.5 to 15 wt %), based on weight of the cleaning bar, of a builder; wherein the builder is selected from the group consisting of hydratable alkali metal phosphates, alkalis (including carbonates and bicarbonates), zeolites, ethylenediaminetetraacetate, nitrilotriacetate and mixtures thereof. More preferably, the cleaning bar of the present invention, optionally further comprises 0 to 50 wt % (preferably, 8 to 40 wt %; more preferably, 10 to 30 wt %; most preferably, 10.5 to 15 wt %), based on weight of the cleaning bar, of a builder; wherein the builder is selected from the group consisting of zeolite, sodium citrate, sodium carbonate, calcium carbonate, sodium bicarbonate, calcium bicarbonate and mixtures thereof. Most preferably, the cleaning bar of the present invention, optionally further comprises 0 to 50 wt % (preferably, 8 to 40 wt %; more preferably, 10 to 30 wt %; most preferably, 10.5 to 15 wt %), based on weight of the cleaning bar, of a builder; wherein the builder includes at least one of sodium carbonate and calcium carbonate.

Preferably, the cleaning bar of the present invention, further comprises a humectant. More preferably, the cleaning bar of the present invention, further comprises 0.1 to 5 wt % (preferably, 0.25 to 2 wt %; more preferably, 0.5 to 1.5 wt %; most preferably, 0.75 to 1.25 wt %), based on weight of the cleaning bar, of a humectant. Still more preferably, the cleaning bar of the present invention, further comprises 0.1 to 5 wt % (preferably, 0.25 to 2 wt %; more preferably, 0.5 to 1.5 wt %; most preferably, 0.75 to 1.25 wt %), based on weight of the cleaning bar, of a humectant; wherein the humectant is a polyhydric alcohol selected from the group consisting of glycerin, sorbitol, propylene glycol, butylene glycol, hexylene glycol, ethoxylated glucose, 1,2-hexane diol, hexanetriol, dipropylene glycol, erythritol, trehalose, diglycerin, xylitol, maltitol, maltose, glucose, fructose and mixtures thereof. Yet more preferably, the cleaning bar of the present invention, further comprises 0.1 to 5 wt % (preferably, 0.25 to 2 wt %; more preferably, 0.5 to 1.5 wt %; most preferably, 0.75 to 1.25 wt %), based on weight of the cleaning bar, of a humectant; wherein the humectant includes glycerin. Most preferably, the cleaning bar of the present invention, further comprises 0.1 to 5 wt % (preferably, 0.25 to 2 wt %; more preferably, 0.5 to 1.5 wt %; most preferably, 0.75 to 1.25 wt %), based on weight of the cleaning bar, of a humectant; wherein the humectant is glycerin.

Preferably, the cleaning bar of the present invention, further comprises a processing aid. More preferably, the cleaning bar of the present invention, further comprises 0.01 to 3 wt % (preferably, 0.1 to 1.5 wt %; more preferably, 0.25 to 1.25 wt %; most preferably, 0.5 to 1 wt %), based on weight of the cleaning bar, of a processing aid. Still more preferably, the cleaning bar of the present invention, further comprises: 0.01 to 3 wt % (preferably, 0.1 to 1.5 wt %; more preferably, 0.25 to 1.25 wt %; most preferably, 0.5 to 1 wt %), based on weight of the cleaning bar, of a processing aid; wherein the processing aid is an inorganic powdery material selected from the group consisting of talc, calcite, kaolin, silicon dioxide, titanium dioxide, diatomaceous earth and mixtures thereof. Yet more preferably, the cleaning bar of the present invention, further comprises: 0.01 to 3 wt % (preferably, 0.1 to 1.5 wt %; more preferably, 0.25 to 1.25 wt %; most preferably, 0.5 to 1 wt %), based on weight of the cleaning bar, of a processing aid; wherein the processing aid is selected from the group consisting of talc, calcite, titanium dioxide and mixtures thereof. Most preferably, the cleaning bar of the present invention, further comprises: 0.01 to 3 wt % (preferably, 0.1 to 1.5 wt %; more preferably, 0.25 to 1.25 wt %; most preferably, 0.5 to 1 wt %), based on weight of the cleaning bar, of a processing aid; wherein the processing aid includes titanium dioxide.

Preferably, the cleaning bar of the present invention, further comprises a chelating agent. More preferably, the cleaning bar of the present invention, further comprises: 0.01 to 0.5 wt % (preferably, 0.05 to 0.3 wt %; more preferably, 0.075 to 0.25 wt %; most preferably, 0.1 to 0.2 wt %), based on weight of the cleaning bar, of a chelating agent. Still more preferably, the cleaning bar of the present invention, further comprises: 0.01 to 0.5 wt % (preferably, 0.05 to 0.3 wt %; more preferably, 0.075 to 0.25 wt %; most preferably, 0.1 to 0.2 wt %), based on weight of the cleaning bar, of a chelating agent; wherein the chelating agent is selected from the group consisting of diethylenetriamine pentaacetic acid; 1-hydroxyethane 1,1-diphosphonic acid; citric acid; ethylene diamine tetraacetic acid (EDTA), salts thereof and mixtures thereof. Yet more preferably, the cleaning bar of the present invention, further comprises: 0.01 to 0.5 wt % (preferably, 0.05 to 0.3 wt %; more preferably, 0.075 to 0.25 wt %; most preferably, 0.1 to 0.2 wt %), based on weight of the cleaning bar, of a chelating agent; wherein the chelating agent is selected from the group consisting of diethylenetriamine pentaacetic acid pentasodium salt, 1-hydroxyethane 1,1-diphosphonic acid disodium salt; citric acid, ethylene diamine tetraacetic acid (EDTA), ethylene diamine tetraacetic acid tetrasodium salt and mixtures thereof. Most preferably, the cleaning bar of the present invention, further comprises: 0.01 to 0.5 wt % (preferably, 0.05 to 0.3 wt %; more preferably, 0.075 to 0.25 wt %; most preferably, 0.1 to 0.2 wt %), based on weight of the cleaning bar, of a chelating agent; wherein the chelating agent includes ethylene diamine tetraacetic acid tetrasodium salt.

Preferably, the cleaning bar of the present invention, further comprises a fragrance. More preferably, the cleaning bar of the present invention, further comprises 0.01 to 3 wt % (preferably, 0.1 to 2 wt %; more preferably, 0.5 to 1.75 wt %; most preferably, 0.75 to 1.25 wt %), based on weight of the cleaning bar, of a fragrance.

Preferably, the cleaning bar of the present invention, further comprises a colorant. More preferably, the cleaning bar of the present invention, further comprises: 0.01 to 3 wt % (preferably, 0.1 to 2 wt %; more preferably, 0.5 to 1.75 wt %; most preferably, 0.75 to 1.25 wt %), based on weight of the cleaning bar, of a colorant.

Preferably, the cleaning bar of the present invention, comprises 0 to 70 wt % (preferably, 2 to 65 wt %; more preferably, 2.5 to 60 wt %; most preferably, 3 to 55 wt %), based on weight of the cleaning bar, of a filler. More preferably, the cleaning bar of the present invention, comprises 0 to 70 wt % (preferably, 2 to 65 wt %; more preferably, 2.5 to 60 wt %; most preferably, 3 to 55 wt %), based on weight of the cleaning bar, of a filler; wherein the filler further includes a substance selected from the group consisting of a sulfate (e.g., magnesium sulfate), a chloride (e.g., sodium chloride), a calcite, a silicate (e.g., sodium silicate; hydrated aluminum silicate), a dolomite and mixtures thereof. Most preferably, the cleaning bar of the present invention, comprises 0 to 18 wt % (preferably, 2 to 10 wt %; more preferably, 2.5 to 7.5 wt %; most preferably, 3 to 5 wt %), based on weight of the cleaning bar, of a filler; wherein the filler includes sodium silicate.

Cleaning bars of the present invention may be produced using well known techniques, including melt casting (aka melt and pour), stamping, extruding, milling, plodding and combinations thereof.

Preferably, the method of making a cleaning bar of the present invention comprises: providing a cleaning surfactant (preferably, wherein the cleaning surfactant is a soap; more preferably, wherein the cleaning surfactant is a soap provided as soap noodles; most preferably, wherein the cleaning surfactant is a soap provided as soap noodles comprising an aqueous mixture of at least 70 wt % of total fatty material (TFM) and 10 to 15 wt % water); providing water; providing a crosslinked cellulose ether containing 0.1 to 0.6 wt %, based on weight of the crosslinked cellulose ether, of polyether groups; mixing the cleaning surfactant, the crosslinked cellulose ether and the water to form a combination (preferably, heating the cleaning surfactant and the crosslinked cellulose ether and the water while mixing to form the combination); milling the combination; extruding the milled combination; and stamping the extruded material to provide the cleaning bar. More preferably, the method of making a cleaning bar of the present invention, comprises: providing a cleaning surfactant (preferably, wherein the cleaning surfactant is a soap; more preferably, wherein the cleaning surfactant is a soap provided as soap noodles; most preferably, wherein the cleaning surfactant is a soap provided as soap noodles comprising an aqueous mixture of at least 70 wt % of total fatty material (TFM) and 10 to 15 wt % water); providing water; providing a crosslinked cellulose ether containing 0.1 to 0.6 wt %, based on weight of the crosslinked cellulose ether, of polyether groups; providing a fragrance; providing a processing aid; mixing the cleaning surfactant, the crosslinked cellulose ether, the fragrance, the processing aid and the water to form a combination; milling the combination; extruding the milled combination; and stamping the extruded material to provide the cleaning bar.

Some embodiments of the present invention will now be described in detail in the following Examples.

Synthesis 1: Crosslinked Cellulose Ether

The crosslinking agent used in Synthesis 1 was a linear poly(propyleneglycol) diglycidyl ether made from polypropylene glycol (PPG) having a molecular weight of ~400 Daltons and having the formula

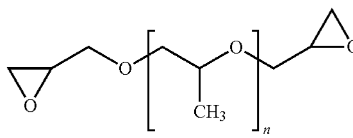

wherein n is 5.7 to 6.7 (available from Leuna-Harze GmbH, Leuna, DE as EPILOX™ M985 poly(propyleneglycol) diglycidylether crosslinker).

Ground cellulose flock (1.5 mol) was added to a 5 L autoclave. After purging the autoclave trice with nitrogen gas, the contents of the autoclave were heated to 40° C. Then dimethylether (DME, 4.7 mol/mol of anhydroglucose units (AGU)) and methyl chloride (MCl; 3.2 mol/mol AGU) were injected into the autoclave. Caustic soda (NaOH, strength 50 wt % aqueous, 1.9 mol NaOH/mol AGU) was added to the autoclave in 3 portions during 2 minutes at a temperature of 40° C. The reaction mixture was held at 40° C. for 30 minutes. Ethylene oxide (0.45 mol/mol AGU) was then added and the reaction mixture was held for 10 minutes at 40° C. The crosslinker (EPILOX™™ M985 crosslinker; 0.0025 mol/mol AGU) was dissolved in 20 mL of isopropanol and added to the contents of the autoclave in six increments in 30 second intervals. The contents of the autoclave were then heated to 80° C. in 40 minutes. At 80° C. a water soluble monovalent copper ligand (MCL 2; 1.3 mol/mol AGU) was injected into the autoclave quickly. Afterwards, NaOH (0.67 mol/mol AGU) was added in 7 portions over 30 minutes, followed by a 70 minute cook-off time at 80° C. Following this, the product crosslinked cellulose ether was washed in hot (>95° C.) water, neutralized with formic acid, granulated, dried and milled.

Comparative Example C1 and Examples 1-7: Cleaning Bars

Cleaning bars were prepared having the composition noted in Table 1 for each of Comparative Example C1 and Examples 1-7. Soap noodles were crushed in sigma mixer and mixed along with the other ingredients in the amounts noted in Table 1 in the sigma mixer. All ingredients were added sequentially with no specific order, except for the perfume, which was added last. The entire mass was then transferred from the sigma mixer to a triple roll mill to triturate the mixture. All the processes were carried out under ambient conditions in the laboratory. The mass received from roll mill was then plodded in a screw plodder and extruded at a temperature of 45 to 65° C. The extruded mass was then cut into small pieces and punched in a soap die to provide the final product cleaning bars.

TABLE 1

| | Examples (wt %) | | | | | | | |
|---|---|---|---|---|---|---|---|---|
| Component | C1 | 1 | 2 | 3 | 4 | 5 | 6 | 7 |
| Soap Noodles[1] | 85.25 | 69.25 | 69.25 | 69.25 | 68.25 | 69.75 | 61.38 | 51.63 |
| Sodium silicate[2] | 8 | 8 | 8 | 8 | 8 | 8 | 9.16 | 11.24 |
| $TiO_2$ | 0.75 | 0.75 | 0.75 | 0.75 | 0.75 | 0.75 | 0.46 | 0.39 |
| Fragrance[3] and Dyes | 1 | 1 | 1 | 1 | 1 | 1 | 0.46 | 0.46 |
| Product Synthesis 1 | 0 | 0.125 | 0.25 | 0.5 | 0.75 | 1.0 | 0.92 | 1.17 |
| Sodium Chloride | 0 | 0 | 0 | 0 | 0 | 0 | 0 | 1.57 |
| Additional water | 5 | 20.875 | 20.75 | 20.5 | 21.25 | 19.5 | 27.62 | 33.54 |

[1]Wilfarin SN-8020 soap noodles available from Adani Wilmer Limited

[2]Aqueous sodium silicate solution (50 wt %)

[3]Ocean Beauty available from Aarav Fragrance

Cleaning Bar Moisture Content

The water content of the cleaning bars prepared according to Comparative Example C1 and Examples 1-7 was measured using a Mettler Toledo HX204 Halogen Moisture Analyzer using a drying temperature set at 150° C. and a 0.5 g sample selected from a cross section of the cleaning bars. The water contents are reported in Table 2.

TABLE 2

| Cleaning bar | Water Content (wt %) |
|---|---|
| Comparative Example C1 | 19.67 |
| Example 1 | 30.66 |
| Example 2 | 31.25 |
| Example 3 | 31.98 |
| Example 4 | 30.68 |
| Example 5 | 29.38 |
| Example 6 | 35.00 |
| Example 7 | 41.25 |

Cleaning Bar Wear Rate

A trained panelist evaluated each of the cleaning bars prepared according to Comparative Example C1 and Examples 1-7 to assess the wear rate as the percent weight loss from the cleaning bar after 4 days of use using the following test protocol. Take poplin cotton fabrics of 20 cm×15 cm immersed in water. Weigh the cleaning bars initially (each cleaning bar composition is tested in triplicate). Scrub the bars 10 times with the top surface of the bar on the fabric surface. Each scrub is one horizontal stroke. Then scrub the bars 10 times with the bottom surface onto a different fabric kept under the same conditions using similar method. In total there will be 20 scrubs per cleaning bar. Set the cleaning bar aside for thirty minutes and then repeat the procedure. The process is repeated five times per day for each cleaning bar (i.e., 100 scrubs per cleaning bar per day). The cleaning bars are then maintained in a petri dish, in a tray with some water, covered with a paraffin film for overnight just to create a humidity. The next day the process is repeated (i.e., 100 scrubs per cleaning bar) and then the cleaning bars are stored as noted. This is continued for four consecutive days. On the fifth day the cleaning bars are weighed with the average wear rate reported in Table 3.

TABLE 3

| Cleaning bar | Wear Rate (wt %) |
|---|---|
| Comparative Example C1 | 10.64 |
| Example 1 | 10.34 |
| Example 2 | 8.90 |
| Example 3 | 6.86 |
| Example 4 | 3.80 |
| Example 5 | 3.26 |
| Example 6 | 3.15 |
| Example 7 | 2.92 |

We claim:

1. A cleaning bar, comprising:

5 to <78.99 wt %, based on weight of the cleaning bar, of a cleaning surfactant;

>21 to 50 wt %, based on weight of the cleaning bar, of water; and 0.01 to 5 wt %, based on weight of the cleaning bar, of a crosslinked cellulose ether containing 0.1 to 0.6 wt %, based on weight of the crosslinked cellulose ether, of polyether groups;

0 to 3 wt %, based on weight of the cleaning bar, of a processing aid;

0 to 3 wt %, based on weight of the cleaning bar, of an optional component selected from the group consisting of a fragrance, a colorant/dye or a combination thereof;

0 to 15 wt %, based on weight of the cleaning bar, of a filler;

wherein the cleaning bar is a solid.

2. The cleaning bar of claim 1, wherein the crosslinked cellulose ether is an irreversibly crosslinked cellulose ether.

3. The cleaning bar of claim 2, wherein the polyether groups in the irreversibly crosslinked cellulose ether are polyoxyalkylene groups having 2 to 100 oxyalkylene groups.

4. The cleaning bar of claim 3, wherein the polyoxyalkylene groups are selected from the group consisting of a polyoxyethylene, a polyoxypropylene and combinations thereof.

5. The cleaning bar of claim 4, wherein the irreversibly crosslinked cellulose ether comprises a base cellulose ether and crosslinks; wherein the crosslinks contain the polyether groups; and wherein the base cellulose ether contains hydroxyalkyl ether and alkyl ether groups.

6. The cleaning bar of claim 5, wherein the base cellulose ether is selected from the group consisting of hydroxyethyl methylcellulose, hydroxypropyl methyl cellulose, methyl hydroxyethyl hydroxypropylcellulose, ethyl hydroxyethyl cellulose and combinations thereof.

7. The cleaning bar of claim 1, wherein the cleaning surfactant is a soap; wherein the cleaning bar comprises 35 to <78.99 wt %, based on weight of the cleaning bar, of the soap; and wherein the cleaning bar further comprises:

0.01 to 3 wt %, based on weight of the cleaning bar, of a processing aid; and 0.01 to 3 wt %, based on weight of the cleaning bar, of an optional component selected from the group consisting of at least one of a fragrance and a dye; and wherein the cleaning bar is a laundry cleaning bar.

8. The cleaning bar of claim 1, wherein the cleaning surfactant is a soap; wherein the cleaning bar comprises 35 to <78.99 wt %, based on weight of the cleaning bar, of the soap; and wherein the cleaning bar further comprises:

0.01 to 3 wt %, based on weight of the cleaning bar, of a processing aid;

0.01 to 3 wt %, based on weight of the cleaning bar, of an optional component selected from the group consisting of at least one of a fragrance and a dye; and 0.1 to 5 wt %, based on weight of the cleaning bar, of a humectant; and wherein the cleaning bar is a personal care cleansing bar.

9. A method of making a cleaning bar, comprising:

providing a cleaning surfactant;

providing water;

providing a crosslinked cellulose ether containing 0.1 to 0.6 wt %, based on weight of the crosslinked cellulose ether, of polyether groups;

mixing the cleaning surfactant, the crosslinked cellulose ether and the water to form a combination;

milling the combination;

extruding the milled combination; and stamping the extruded material to provide the cleaning bar.

10. The method of claim 9, further comprising:

providing a fragrance; and providing a processing aid;

wherein the fragrance and the processing aid are mixed along with the cleaning surfactant, the crosslinked cellulose ether and the water to form the combination.

* * * * *